(12) United States Patent
Laar et al.

(10) Patent No.: US 7,270,534 B2
(45) Date of Patent: Sep. 18, 2007

(54) OPERATING SYSTEM FOR AN EXTERNALLY OPERATED PART OF A CLOSING UNIT

(75) Inventors: Erwin Laar, Holzkirchen (DE); Manfred Holzner, Gröbenzell (DE); Janusz Hontz, Kirchseeon (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 181 days.

(21) Appl. No.: 10/547,517

(22) PCT Filed: Dec. 3, 2003

(86) PCT No.: PCT/EP03/13623

§ 371 (c)(1),
(2), (4) Date: Sep. 9, 2005

(87) PCT Pub. No.: WO2004/076148

PCT Pub. Date: Sep. 10, 2004

(65) Prior Publication Data

US 2006/0165838 A1 Jul. 27, 2006

(30) Foreign Application Priority Data

Feb. 28, 2003 (DE) ............................. 103 08 728

(51) Int. Cl.
*B29C 33/26* (2006.01)

(52) U.S. Cl. .................... 425/451; 425/442; 425/451.4
(58) Field of Classification Search ................ 425/442, 425/451, 451.4

See application file for complete search history.

(56) References Cited

U.S. PATENT DOCUMENTS 2,732,584 A * 1/1956 Bishop ....................... 425/451

(Continued)

FOREIGN PATENT DOCUMENTS

DE         20 51 525         5/1972

(Continued)

*Primary Examiner*—James P. Mackey
(74) *Attorney, Agent, or Firm*—Henry M. Feiereisen

(57) ABSTRACT

The invention relates to an operating system for an externally operated part of a closing unit, in particular for a mold carrier of a closing unit. During operation, the entire closing unit (12) moves in a predefined first direction (D) and the externally operated part (18) can be moved between at least two positions. The externally operated part (18) includes a guide element in the form of a cam roller (22) which is moveable for reaching at least one of the positions in a predefined second position (A) by at least one operating unit (29) arranged separately to the closing unit (12). The operating unit (29) includes at least one gripper member (48) which grabs the cam roller (22) for moving the part (18) to the predefined second position (A) and moves it in this direction. To minimize wear, the gripper member (48) includes two freely moveable guide rollers (50) arranged in parallel relationship at a particular spacing from one another and having axes in substantial parallel or tangential alignment to the first direction (D). The spacing between both guide rollers (50) corresponds essentially to the diameter of the cam roller (22) or is slightly greater than the diameter of the cam roller (22), and the cam roller (22) is able to move into this spacing for moving the externally to-be-operated part (18) in the predefined second position (A) and subsequently is able to move out of the spacing.

11 Claims, 2 Drawing Sheets

U.S. PATENT DOCUMENTS

| | | | |
|---|---|---|---|
| 2,806,252 A * | 9/1957 | Bishop | 425/451.7 |
| 3,602,949 A * | 9/1971 | Kaut | 425/186 |
| 3,647,345 A | 3/1972 | Claessens et al. | |
| 3,712,771 A * | 1/1973 | White et al. | 425/451 |
| 3,771,928 A * | 11/1973 | Gostyn et al. | 425/442 |
| 4,008,990 A | 2/1977 | Hiemer et al. | |

FOREIGN PATENT DOCUMENTS

| | | |
|---|---|---|
| DE | 30 11 200 A1 | 10/1981 |
| DE | 101 52 392 | 4/2003 |
| FR | 2 208 032 A | 6/1974 |

* cited by examiner

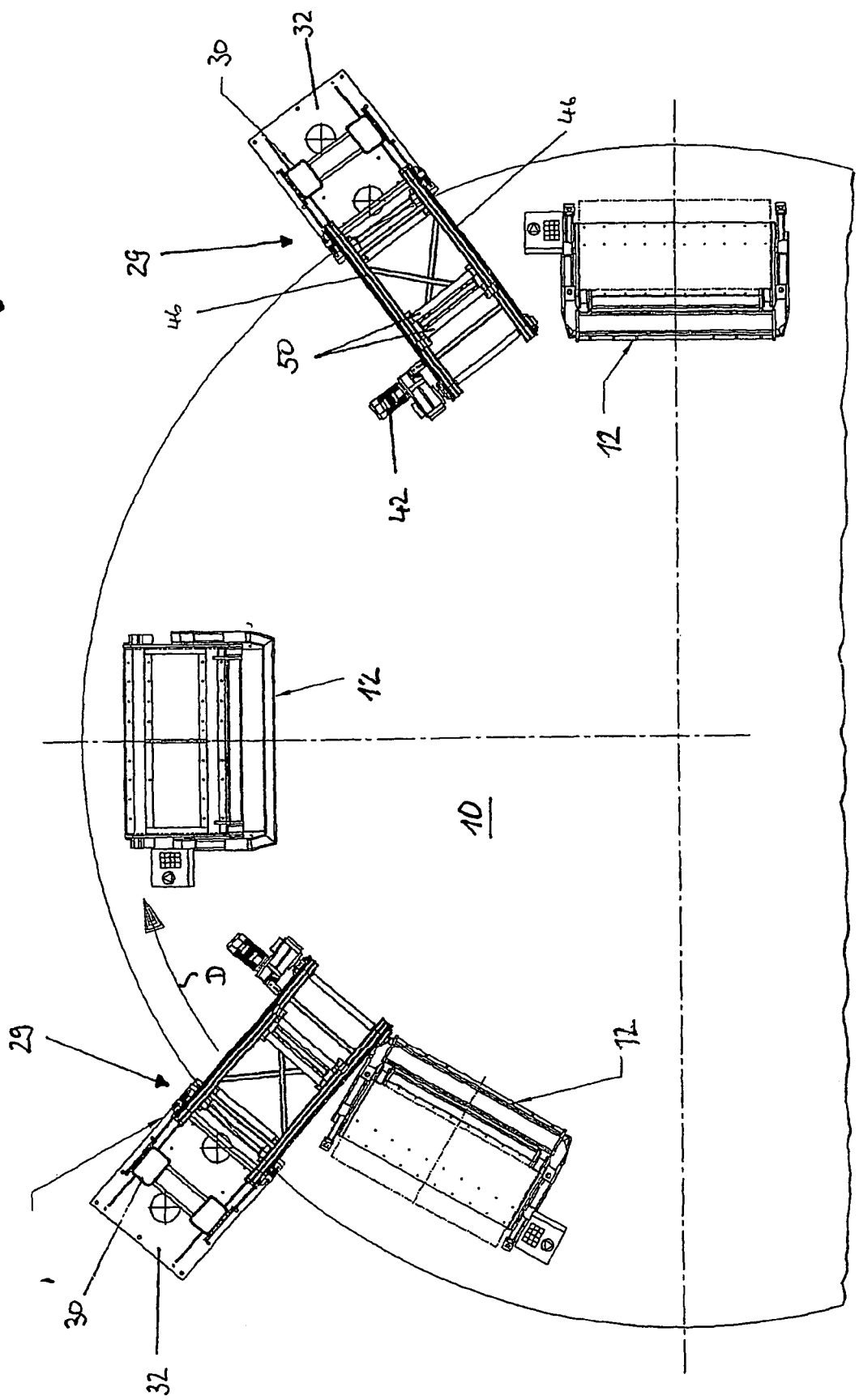

OPERATING SYSTEM FOR AN EXTERNALLY OPERATED PART OF A CLOSING UNIT

BACKGROUND OF THE INVENTION

The invention relates to an operating system for a part of a closing unit which part is to be operated externally, in particular for a tool carrier of a closing unit.

In the following, reference is made to a closing unit for a plastics processing machine with at least one mold carrier. It should be expressly noted, however, that the present invention is equally applicable for other externally operated parts of closing units. The tern "externally to be operated" denotes hereby that an opening and closing apparatus is not arranged within the closing unit but opening and closing of the closing unit is effected outside the closing unit.

Closing units of plastics processing machines, such as polyurethane installations, normally have two mold carriers which, for closing and opening of the closing unit, are movable toward one another (closing) or away from one another (opening). In this context, reference is made to German patent publication DE 101 52 392 which describes a closing unit for a plastics machine. The illustrated closing unit includes a lower mold carrier and an upper mold carrier which are each swingable about a common axis. During operation of the entire closing unit, the lower mold carrier is moved back and forth between two positions, namely a lower position in which mold elements are placed into the mold carrier or mold parts can be removed, and an upper position in which the closing unit is closed altogether to process a starting material in a predetermined manner. The upper mold carrier is also moved back and forth between two positions during operation of the entire closing unit, namely into an upper position in which the closing unit is open, and a lower position for shaping the introduced starting material.

In DE 101 52 392, the closing units themselves are fixedly disposed at one location, only the mold holders are swingably mounted.

It is, however, known, to arrange for example several closing units upon a rotary platform or turntable, with the individual closing units successively undergoing the same operating steps during operation of the turntable. For example, a starting material may be introduced, when the closing unit is open. At the same time, the starting material can be molded to shape in another closing unit. In still another closing unit, a finished molded part may be withdrawn at the same time. The use of such devices—likewise as in DE 101 52 392—requires operation, especially pivoting to open and to close, of the various parts of the closing unit in a predefined manner.

A method known per se involves the use of external actuators, whereby a cam roller is arranged upon an externally to-be-operated part of a closing unit, for example upon an upper mold carrier, for running, at least partly, on a rail structure and is opened or closed by a gripper member at particular positions. It is known to implement the gripper member, for example, in the form of a U profile, with the cam roller being able to move into the groove thereof. When the cam roller is received in the groove of the U profile, a movement of the upper mold carrier is possible by movement (pivoting, travel) of the U profile. Once the upper mold carrier has reached a particular position, it moves out again from the groove of the U profile and may roll subsequently for example on a further rail by means of the cam roller.

The use of such rigid profiles or rails for the gripper member has, however, the drawback of a relative movement between cam roller and rail, when all the closing units are operated. This leads to relatively high wear as a result of friction. Moreover, the gripper member must be precisely adjusted and moved to keep wear as small as possible.

SUMMARY OF THE INVENTION

It is an object of the present invention to substantially minimize wear in an operating system of the afore-stated type.

An essential feature of the invention in connection with an operating system of a type involved here is thus the provision of the gripper member with at least two freely moveable guide rollers arranged in parallel relationship at a particular spacing from one another and having an axis in substantial parallel or tangential alignment to a first direction in which the entire closing unit moves. The spacing between the guide rollers substantially corresponds hereby to the diameter of the cam roller or is selected slightly greater so that the cam roller can be received in this spacing. The cam roller can move into this spacing for moving the part to be externally operated, e.g. a mold carrier, in opening or closing directions, or can be moved out of the spacing following the operation.

By using freely moveable guide rollers in cooperation with the cam roller of the part to be operated externally, sliding friction between the cam roller and the gripper member can be prevented. Rather, the point of contact of the cam roller on the gripper member changes as a result of the rolling motion of one or both guide rollers in axial direction of the cam roller in the absence of any sliding friction. There is only a rotary movement of the guide rollers.

Overall, minimal wear can be ensured even when encountering misalignments.

Of course, more than one operating unit may be provided. In this case, the individual operating units can be tailored to continuously open the parts to be operated externally such as for example the mold carriers, or—with another operating unit—to continuously close the mold carriers. Each operating unit may include one, two or more gripper members. When using several gripper members, a revolving movement of the individual gripper members prevents a to-and-fro actuation.

According to a particularly preferred embodiment, two endless chains and endless belts of same length are arranged in parallel spaced-apart relationship for attachment of the gripper members, in particular in the area of their end, substantially transverse to the movement direction. Such an embodiment allows the two or more gripper members to execute the opening and closing movements of the part to be operated externally through a revolving operation of the chains or belts in only one direction. More information is provided with reference to the following exemplary embodiment.

The endless chains are preferably trained about two deflection wheels or rollers. One deflection roller or one toothed deflection wheel may hereby be configured as tensioning device or in cooperation with a tensioning device. These endless chains or endless belts are driven preferably by a motor, for example by an electric motor.

In order to ensure the guidance of the part to be operated externally also in the section between two operating units, a rail may be provided in-between on which the cam rollers roll. The rail should hereby adjoin the gripper members in such a way that a smooth transition is assured between rail and gripper members when the closing unit moves in a predefined direction.

According to a particularly preferred embodiment, several closing units are arranged on a turntable, which rotates during operation of the closing units, at same radial distance to the rotation point of the turntable. They respectively pass successively an operating unit, a subsequent rail section as well as a further operating unit. The first operating unit opens the externally to-be-operated part of the closing device from a first position to a level of the rail section, and the second operating unit closes the part to be operated externally from the level back to the first position.

BRIEF DESCRIPTION OF THE DRAWING

An advantageous embodiment of the invention will now be described in greater detail with reference to the attached drawings in which:

FIG. 2 shows a plan view of a carousel-type system according to FIG. 1, with the carousel shown only partially,

DETAILED DESCRIPTION OF PREFERRED EMBODIMENTS

Figure 1:
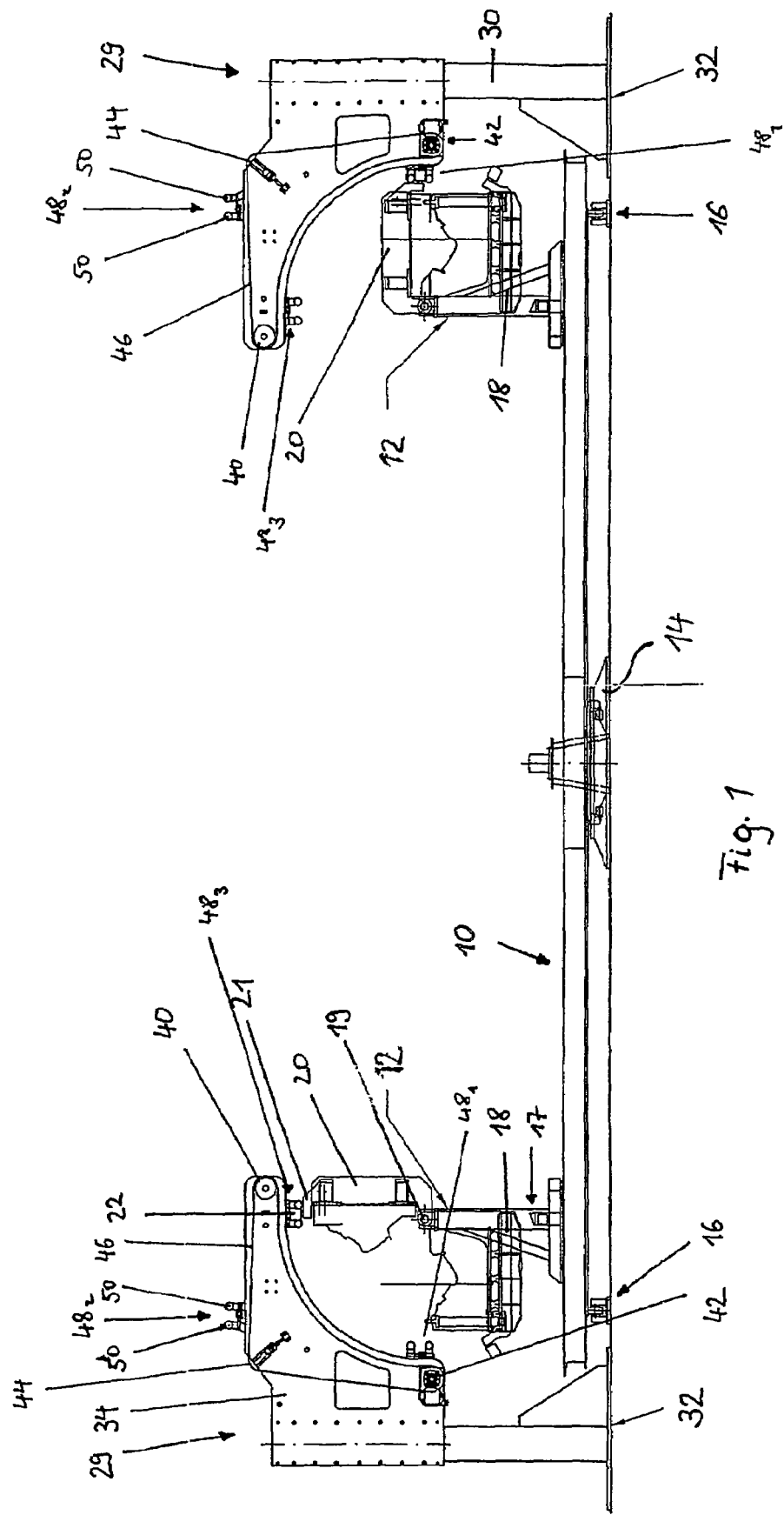
FIG. 1 shows a greatly schematic side view of a carousel-type installation with several closing units and an operating system according to the present invention.

The present invention will now be described in greater detail with reference to a carousel-type system for PUR installations (polyurethane installations). However, the invention is not limited to this system.

Several closing units 12 of a PUR installation, not shown in more detail, are securely disposed on a turntable 10 at substantially same radial distance to its center and in angular offset relationship. FIG. 1 illustrates two closing units in confronting disposition, and FIG. 2 illustrates three closing units in angular offset disposition. Each closing unit 12 includes a lower mold carrier 18 and an upper mold carrier 20 which can both pivot upwardly and downwardly about a common joint axis 19. Of course, separate joint axes may be provided for each mold carrier.

Each closing unit 12 can be closed or opened in its entirety by pivoting the lower and upper mold carriers 18, 20. As a consequence, the mold carriers can be brought into a position that allows introduction of mold elements in ergonomically beneficial manner or removal of molded products from the mold.

The present invention is concerned only with pivoting of the upper mold carrier 20. The pivot mechanism for the lower mold carrier 18 will not be described in more detail.

The upper mold carrier 20 includes in relation to the extension of the turntable a radially inwardly projecting arm 21 which has an outer end for arrangement of a cam roller 22. The rotation axis of the cam roller 22 substantially coincides with the radial direction of the turntable; however it may also slightly deviate therefrom as a result of the off-center arrangement of the cam roller 22 on the upper mold carrier 20.

The operating system according to the invention includes in particular two operating units 29 which can be seen in FIG. 1 as well as in FIG. 2. Each operating unit 29 includes a base 32 standing on the ground for connection of a vertical support 30. Provided on the upper end of the vertical support 30 is a frame of the operating unit which includes essentially two vertically aligned, plate-shaped side portions in mutual supporting relationship, of which one is respectively shown clearly in FIG. 1. Arranged between both plate-shaped side portions of an operating unit are three double toothed wheels 40, 42 and 44 having axes in parallel relationship. Each double toothed wheel 40 is arranged on the upper inner end of its frame 34, each double toothed wheel 42 is arranged on the lower end of its frame 34, and each double toothed wheel 44 is arranged substantially vertical above a double toothed wheel 42 and horizontally outside a double toothed wheel 40 (compare FIG. 1). The frame 34 is configured between the double toothed wheels 42 and 44 substantially in the form of a quarter arc. Both endless chains respectively run on the individual toothed wheels on one side of the double toothed wheels 40, 42 and 44 and carry three gripper members or guide elements $48_1$, $48_2$, $48_3$ staggered in circumferential direction of the chains and extending transversely to the movement direction of the endless chains.

Each guide element 48 includes a carrier, not shown in more detail, and two freely rotatable guide rollers 50 in spaced-apart and parallel relationships. The distance between both guide rollers 50 is selected to correspond to the diameter of the cam roller 22 so that the cam roller 22—as will be described in more detail hereinafter—can be received between both guide rollers. The double toothed wheel 44 serving as tensioning element can be moved over an unillustrated tensioning device as to allow both chains to be sufficiently tensed.

The lower deflection and guide wheel further includes a drive which is configured for movement of both chains in their running direction.

Arranged between both operating units 29 (not shown in more detail in FIGS. 1 and 2) is a rail element in the form of a segment of a circle at approximate level of the innermost guide elements $48_3$ shown in FIG. 1 to provide a connection between both upper guide elements $48_3$ so that a guidance of the upper mold carrier—as will also be described hereinafter—becomes possible as the cam roller 22 rolls on this rail between both operating units 29.

Operation of the turntable with attached closing units 12 will now be described in greater detail. The turntable 10 rotates in arrow direction D (FIG. 2) in unison with the mounted closing units 12 and is hereby supported centrally as well as on the outside by bearings 14 and 16. According to a preferred embodiment, 12 closing units are arranged on the turntable 10 (only 2 closing units are respectively shown in the Figures.). In the lower portion of the turntable, as shown in FIG. 2, the upper mold carrier 20 assumes its closed position (corresponding to the right side in FIG. 1), and is clamped with the lower mold carrier 18. In this position, the cam roller 22 of the upper mold carrier 20 has moved into the spacing between both guide rollers 50 of a guide element 48, which is arranged in FIG. 1 on the left-hand side. After entry of the cam roller 22 into the spacing, this guide element $48_1$, is moved upwards along an arcuate path, depicted in FIG. 1, through actuation of the drive on the lower toothed deflection or guide wheel until reaching the position of the upper guide element $48_3$ shown in FIG. 1. This movement is accompanied by a relative movement between the cam roller 22 and the guide rollers 50 in two aspects. On one hand, the cam roller 22 travels along the axis of the guide rollers, and on the other hand, the contact point shifts in axial direction of the cam roller 22. The latter shift does not produce, however, any sliding friction as a consequence of the free rotatability of the guide rollers and thus causes essentially no wear. Moreover, the contact lines change across the rolling width of the various rollers which also contributes to minimizing wear.

Movement of the cam roller 22 from the position of the lower guide element $48_1$ to the upper guide element $48_3$, causes the upper mold carrier 30 to swing upwards and thereby to open. In this position, the cam roller 22 then moves out of the spacing between both guide rollers 50 of the upper guide element $48_3$, and travels continuously along the segment of a circle on the unillustrated guide rail. The upper mold carrier 20 is continuously in open state during this movement of the turntable 10. When the upper mold carrier 20 then reaches the further operating unit 29, which acts as closing station, the running roller 22 moves again into the spacing between both guide rollers 50 of the upper guide element $48_3$. Conversely, like the opposing operating unit 29, operation of the drive at the deflection and guide wheel causes the upper guide element $48_3$, to move downwards so that the upper mold carrier 20 is closed in analogous manner by moving along a quarter circle path. In the lower position, the upper mold carrier 20 is then clamped and exits the spacing between both guide rollers 50.

Through arrangement of three guide elements $48_1$, $48_2$, $48_3$ on both chains 46 of the illustrated operating units 29, it is possible that the chains move respectively only in one movement direction. When suitably adjusting the chain length, one guide element 48 then occupies an exit position whereas the other guide element 48 s disposed in the entry position. As the upper mold carrier 20 pivots upwards or downwards, a next guide element 48 is moved simultaneously into the necessary position for the subsequent upper mold carrier 20 of a next closing unit 12. All chains move counterclockwise in FIG. 1. Of course, embodiments are possible having only one gripper member which is then shuttles back and forth.

In summary, the invention allows prevention of excessive wear and to ensure easier adjustment and compensation of manufacturing and assembly tolerances. Wear as encountered in previously used fixed U profiles or other fixedly arranged rails can hereby be prevented.

What is claimed is:

1. Operating system for an externally operated part of a closing unit, in particular for a mold carrier of a closing unit, wherein
    the closing unit executes a movement in a predefined first direction, and the externally operated part (18) is moveable between at least two positions,
    wherein the externally operated part includes a guide element in the form of a cam roller which in order to reach at least one of the positions is moveable in a predefined second direction (A) by at least one operating unit arranged separately to the closing unit, and
    wherein the operating unit includes at least one gripper member which grabs the cam roller for moving the part to the predefined second direction, wherein the gripper member includes two freely moveable guide rollers arranged in parallel relationship at a particular spacing from one another and having axes in substantial parallel or tangential alignment to the first direction, wherein the spacing between both guide rollers corresponds essentially to a diameter of the cam roller or is slightly greater than the diameter of the cam roller, and the cam roller is constructed to move into the spacing for moving the part in the predefined second direction (A) and subsequently to move out of the spacing.

2. Operating system according to claim 1, further comprising a plurality of said operating unit to interact with one or more of said closing unit.

3. Operating system according to claim 1, further comprising two of said operating unit to interact with one or more of said closing unit.

4. Operating system according to claim 1, wherein the operating unit has two or more gripper members.

5. Operating system according to claim 4, further comprising two power transmitting elements selected from the group consisting of endless chains and endless belts and having a same length, said power transmitting elements arranged in parallel spaced-apart relationship, and having secured thereto each of the gripper members in substantial transverse relationship to a movement direction of the power transmitting elements.

6. Operating system according to claim 5, wherein the power transmitting elements are trained over at least two deflection members selected from the group consisting of deflection wheels and deflection rollers.

7. Operating system according to claim 6, wherein at least one of the deflection members interacts with a tensioning device for tensioning the power transmitting elements.

8. Operating system according to claim 5, wherein the power transmitting elements are driven by an electric motor.

9. Operating system according to claim 4, further comprising a rail between two of said operating unit for guiding the cam roller, wherein the rail adjoins the gripper members in such a way that a smooth transition between the rail and the gripper members is realized when the closing unit moves in the first direction.

10. Operating system according to claim 9, further comprising a turntable for attachment of several of said closing unit, at same radial distance to a rotation point of the turntable, wherein the closing units pass successively one of the operating units, the rail, and the other one of the operating units, wherein the one operating unit opens the part from one position to a level of the rail, and the other operating unit closes the part from the level of the rail back to the one position.

11. Operating system according to claim 3, wherein one of the operating units is provided to realize an upward movement of the part, and the other one of the operating units is provided to realize a downward movement of the part.

* * * * *